United States Patent [19]
Béguin

[11] 3,880,388
[45] Apr. 29, 1975

[54] LEG TYPE SUPPORT WITH AUTOMATIC ADJUSTMENT

[75] Inventor: René Béguin, Chene-Bougeries, Geneva, Switzerland

[73] Assignee: Test, Societe anonyme d'Etudes techniques, Chene-Bougeries, Switzerland

[22] Filed: Apr. 20, 1973

[21] Appl. No.: 353,728

[30] Foreign Application Priority Data
May 12, 1972   Switzerland.......................... 7025/72

[52] U.S. Cl.............................. 248/188.3; 182/202
[51] Int. Cl. .............................................. E06c 7/44
[58] Field of Search ......... 248/188.3, 182; 182/202, 182/200

[56] References Cited
UNITED STATES PATENTS
| | | | |
|---|---|---|---|
| 2,548,311 | 4/1951 | Johnson | 182/202 |
| 3,090,466 | 5/1963 | Wright | 182/202 |
| 3,102,606 | 9/1963 | Hopfeld | 182/202 |
| 3,794,141 | 2/1974 | Sturm | 182/202 |

FOREIGN PATENTS OR APPLICATIONS
| | | | |
|---|---|---|---|
| 394,848 | 7/1933 | United Kingdom | 248/188.3 |
| 183,886 | 5/1963 | Sweden | 182/202 |

*Primary Examiner*—Marion Parsons, Jr.
*Attorney, Agent, or Firm*—Kurt Kelman

[57] ABSTRACT

A leg-type support with automatic length adjustment having at least two vertically movable supporting elements which are coupled by a transmission means so arranged that one of the supporting elements descends when the other is pushed upwardly. The transmission means comprises thrust elements accommodated in a tubular enclosure such that relative movement of the thrust elements results in alternative elongation and contraction phases of the effective length of the transmission means so that when the supporting elements are both retained pronounced locking positions are obtained which correspond to the contraction phases of the transmission means.

4 Claims, 4 Drawing Figures

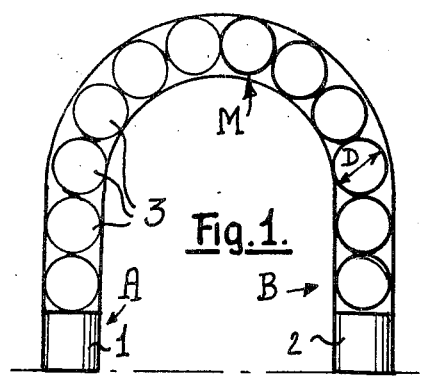
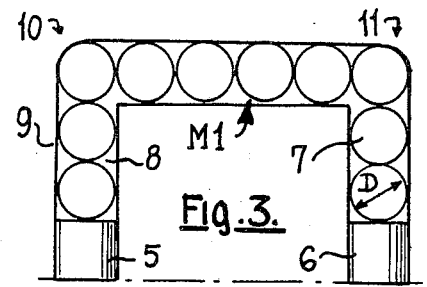
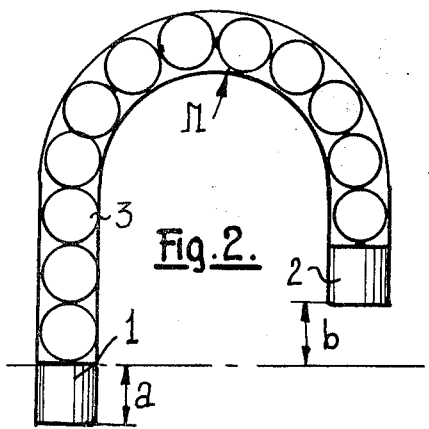
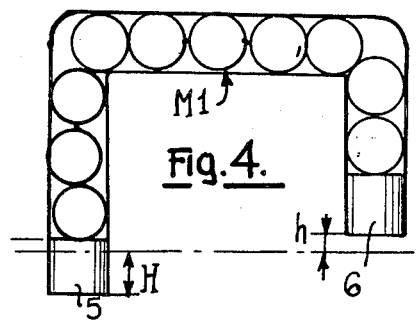
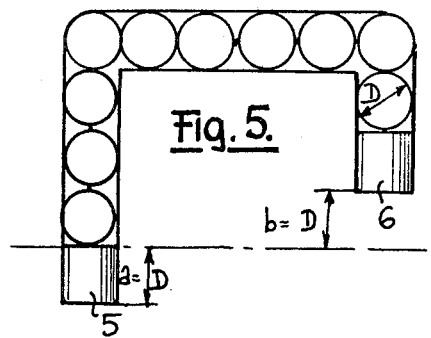
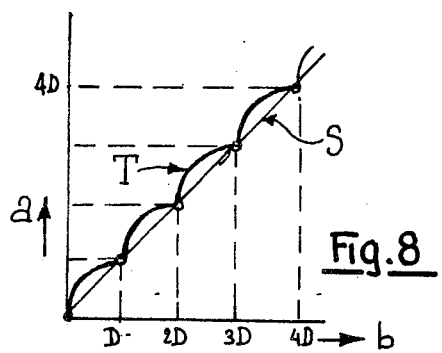

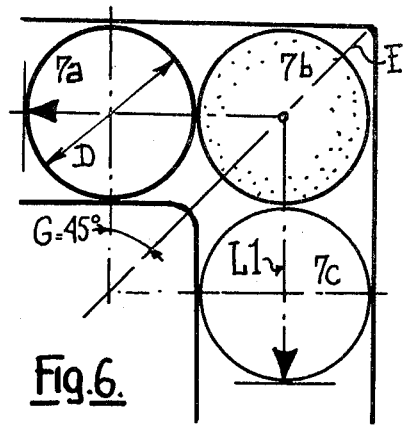
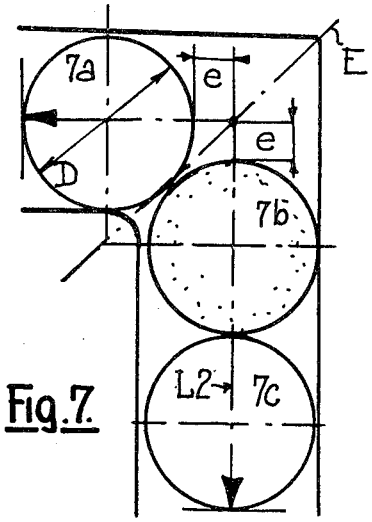
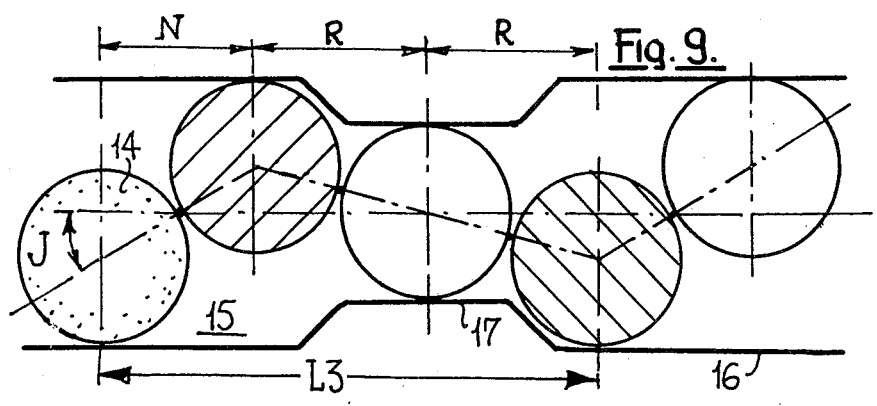
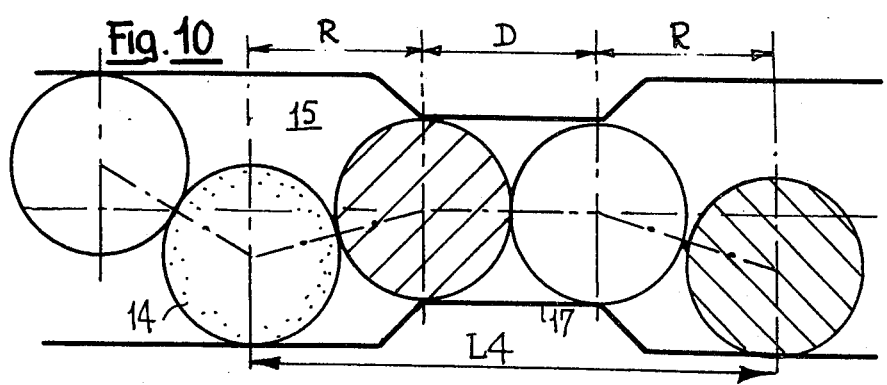

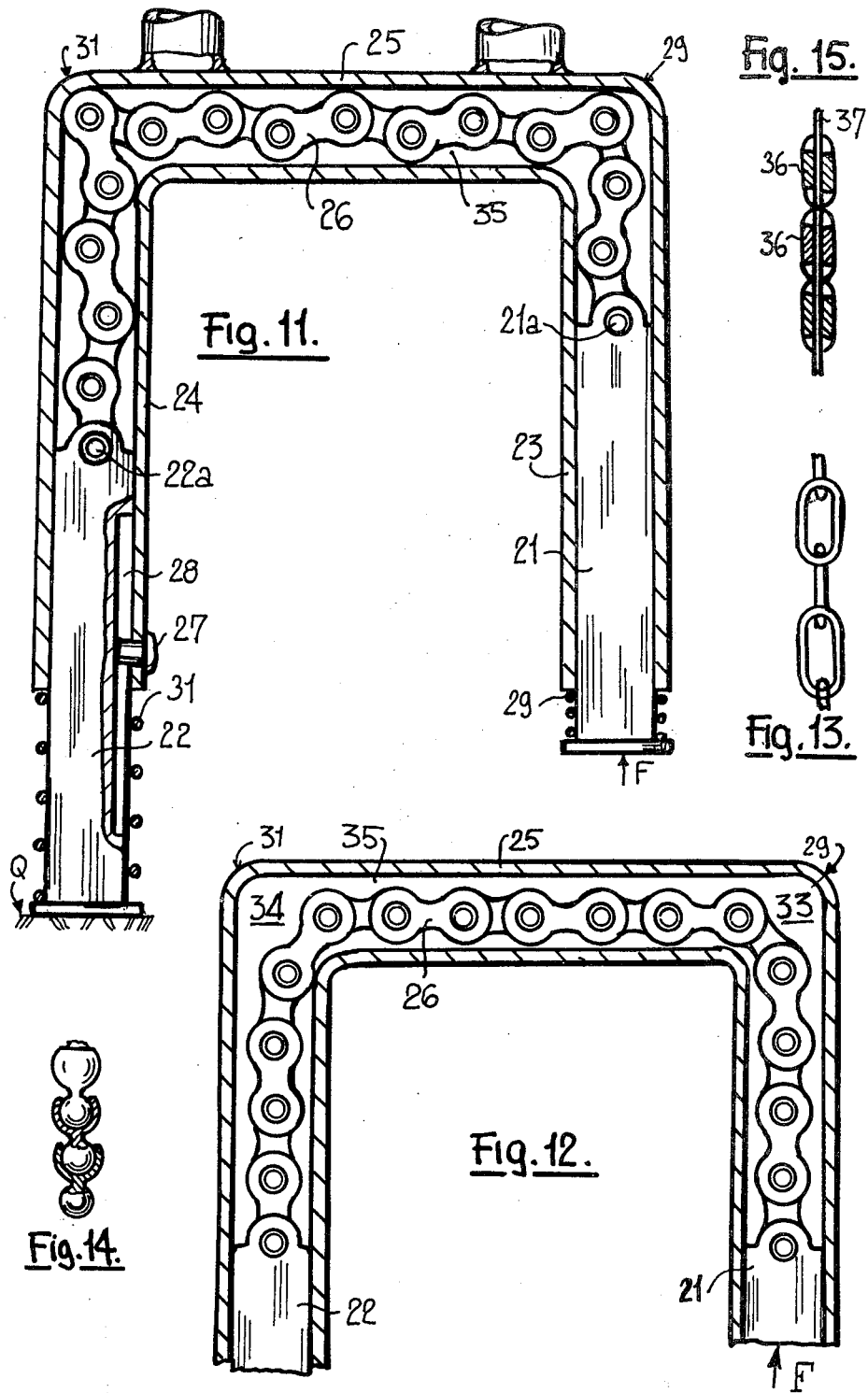

LEG TYPE SUPPORT WITH AUTOMATIC ADJUSTMENT

BACKGROUND OF INVENTION

Various automatically adjustable leg-type supports are known, which have been proposed for all kinds of applications, e.g., furniture, ladders, wheelbarrows and so on. These known supports are used only rarely, either because they are very complicated and expensive, as is the case with certain hydraulic compensation systems which have been proposed, or because they are unreliable in operation as is the case with wedge or ball systems, the locking of which is based on friction.

SUMMARY OF THE INVENTION

This invention provides a support which is very simple, can be manufactured cheaply and which gives greater operational reliability than known supports. By operational reliability it is meant that the support must readily and automatically adjust its legs appropriately when it is placed on an irregular surface and that such adjustment once made must be held while the support is loaded, in order to obviate any accident.

The support accordingly comprises at least two vertically movable supporting elements which are coupled by a transmission means so arranged that one of the supporting elements descends when the other is pushed upwardly. The transmission means comprises thrust elements accommodated in an enclosure in which they change their relative positions on the combined movement of the supporting elements. The enclosure is so designed that the relative movement of the thrust elements results in alternate elongation and contraction phases of the effective length of the transmission means so that when the supporting elements are both retained, pronounced locking positions are obtained which correspond to the contraction phases of the transmission means.

BRIEF DESCRIPTION OF THE DRAWINGS

FIGS. 1 and 2 are diagrams of a known support having two adjustable legs, two different adjusted positions of the legs of the support being shown.

FIGS. 3 to 5 are schematic diagrams of a first form of support according to the invention having two adjustable legs, three different adjustable positions of the legs of the support being shown.

FIGS. 6 and 7 are schematic diagrams showing the operation of the support of FIGS. 3 to 5.

FIG. 8 is a graph showing the different operations of the known support of FIG. 1 and of the support of FIG. 3.

FIGS. 9 and 10 are schematic diagrams showing the operation of another form of support according to the invention.

FIGS. 11 and 12 are vertical sectional views of a third form of support according to the invention in two different operational states, and FIGS. 13, 14 and 15 show various thrust elements which may be used in a support similar to that of FIGS. 11 and 12.

In the known leg-type support shown diagrammatically in FIGS. 1 and 2, which comprises a tube of inverted U-shape, the limbs of which define the legs A and B of the support, supporting feet (not shown) are rigidly connected (by means extending through the open ends of the tube) to supporting elements 1, 2 slidable within the respective straight end parts of the limbs of the U. The interior of the tube between the supporting elements 1, 2 accommodates a series of balls 3, each being loose fit in the tube. The supporting elements 1 and 2 are thus effectively coupled by transmission means M constituted by the series of balls 3. When the supporting element 2 rises by a height $h$ (FIG. 2), the supporting element 1 descends by an equal height $a$. Since the tube in FIGS. 1 and 2 is bent in the form of a semi-circle, the ends of which are connected to longitudinally extending straight portions (which form the legs A, B), the length of the transmission means M formed by the balls does not change appreciably during the above movement, and locking of the support, which is obtained solely by friction, is unreliable. In a variant of this known support, a wedge interposed between the balls may be provided to increase the friction, but although locking is improved in the loaded position as a result, the mechanism then remains locked subsequently and prevent required adjustments.

DESCRIPTION OF PREFERRED EMBODIMENTS

The support according to the invention illustrated diagrammatically in FIGS. 3, 4 and 5 differs from that of FIGS. 1 and 2 only in that the inverted U-shaped tube 9, which provides an enclosure 8 housing balls 7, comprises three straight sections, one of which forms the base of the U and is connected to the other sections forming the limbs of the U, (and thus the legs of the support) by respective right-angled bends 10 and 11. In FIGS. 3 to 5 the two vertically movable supporting elements are denoted as 5 and 6 and the transmission means formed by the balls 7 is denoted as M1. The series of balls 7 is again so arranged that one of the elements 5, 6 is pushed downwards when the other is pushed upwardly (FIG. 4), the balls 7 forming thrust members. The angle of the bends 10 and 11 may be 90°, or alternatively may be of some other angle, preferably from 80° to 100°.

The movements of the balls 7 along the tube 9 necessarily results in variations in the effective length of the transmission means M1 formed by the series of balls 7. Consequently, the changeover between the position of FIG. 3 and that of FIG. 5, wherein balls occupy the bends, as shown, and in which the effective length of the transmission means is at a minimum, can occur only by passing through intermediate positions such as the one illustrated in FIG. 4, in which the effective length of the transmission is greater than the minimum. In the position illustrated in FIG. 4, the supporting element 5 has descended by a greater height H than the height $h$ by which the supporting element 6 has risen.

In FIGS. 1 to 5, for convenience of illustration, the portions of the free ends of the limbs of the U-shaped tubes extending below the supporting elements 1, 2 or 5, 6 are not shown but it will be appreciated that both limbs of either of these tubes are of the same length and remain so despite relative movement of the supporting elements, the effective lengths of the respective legs of the support being varied by the telescoping of the support elements within the tube limbs.

FIGS. 6 and 7 are fragmentary enlarged-scale views showing the passage of the balls 7 in the bend 11. With regard to the position shown in FIG. 6 in which a ball 7$b$ occupies the corner, the length 11 occupied by the three successive balls 7$a$, 7$b$ and 7$c$ of a diameter D is $l1 = 3D$. On the other hand, for the position shown in FIG. 7 in which the two balls $7a$ and $7b$ are in contact over the angle bisector E of the bend 11, the length $L2$ occupied by the three balls is greater: $L2 = 3D + 2e$, where $e = D/2/\cos G - D/2$. Thus on each passage of a ball in this bend 11 there is an elongation $P = 2e$, the value of which is $P = 2e = D/\cos G - D$.

For the case illustrated in which $G = 45°$, $P = D$, $(1/0.707 - 1) = 0.41 D$.

Thus the respective operations of the known support in FIG. 1 and the support according to the invention in FIG. 3 are quite different. In the known support, the effective length of the transmission means H does not vary significantly while in the support according to the invention the effective length of the transmission means M1 varies periodically, passing alternately through elongation and contraction phases, depending upon the relative positions of the balls in the enclosure 8.

The respective behaviours of the transmission means M and M1 are illustrated by the graph of FIG. 8, in which the downward displacement $a$ of one of the supporting elements is plotted along the ordinate, and the corresponding displacement $b$ of the other supporting element is plotted along the abscissa. The straight line S corresponding to identical increments of displacement $a$ for identical increments of displacement $b$ relates to the transmission means M of the known device shown in FIG. 1, while the curve T corresponding to varying increments of displacement $a$ corresponding to equal increments of displacement $b$ relates to the transmission means M1 of the device according to the invention shown in FIG. 3.

In a variant of the support of FIGS. 3 to 5, illustrated in FIGS. 9 and 10, balls 14 which form the transmission means between two supporting elements (not shown) are housed in an enclosure 15 consisting of a tube 16 having a constriction 17. In this case, when the balls pass through the constriction, the length of the transmission means varies according to the number of balls housed in the constriction 17, and passes from a minimum shown at L3 in FIG. 9 to a maximum shown at L4 in FIG. 10, depending upon whether one or two balls are housed in the constriction.

The periodic elongation on each passage of a ball is as follows:

$P1 = L4 - L3 = (2R + D) - (2R + N) = D - N = D \cos J = D (1 - \cos J)$.

For sake of clarity, the examples given show the balls only guided in a single line. In variants, pronounced bends or constrictions or other variations in the shape of an enclosure could also produce the required variations in the length of a transmission means comprising balls disposed in any order, in a number of lines if necessary. Similarly, the support could also comprise more than two legs having movable supporting elements, the latter being connected by transmission means either in pairs or in larger numbers.

The support shown in FIGS. 11 and 12, which can be a supporting stand for a motor cycle, comprises supporting elements 21 and 22 vertically movable in parallel limbs 23 and 24 of a tubular guide 25 forming an enclosure 35 in the form of an inverted U comprising three straight sections connected by right angled bends 29 and 31. The supporting elements 21 and 22 are coupled by a transmission means consisting of a roller chain 26 of the type used on sprockets, e.g., of bicycles.

This known type of roller chain is formed from rigid links or thrust elements $26a$ pivoted with respect to one another by means of transverse spindles. The ends of the chain are connected to the supporting elements by means of spindles $21a$ and $22a$ (FIG. 11). A rivet 27 fitted in a closed-ended groove 28 in the element 22 limits the longitudinal movements of this element in the limb 24.

When an upward thrust is exerted on the element 21 as shown by the arrow F in FIG. 12, the opposite element 22 descends unless it is positively retained by an external support, the chain 26, if the element 22 is not so retained, then approximately occupying the tensioned position shown diagrammatically in FIG. 12, in which its links can pass without difficulty around the two bends 29 and 31 of the tubular guide 25.

On the other hand, when the descending supporting element 22 comes into contact with a surface as shown at Q in FIG. 11, some of the links of the chain 26, which is then compressed, will form abutments in the corner parts 33 and 34 of the enclosure 35 bounded by the tubular guide 25, thus locking the chain 26 and the two supporting elements 21 and 22. The chain 26 then occupies a shorter length than it occupied in the free position, thus forming a locking means which positively retains the two supporting elements in their respective adjusted positions.

Because of the bends 29 and 31, the movement of the chain 26 in the enclosure 35 in either the extended or the compressed position must result in alternate elongation and shortening phases of the transmission means between the supporting elements as a result of the relative movement of the links. The variable geometry of the thrust elements formed by the links $26a$ thus produces a large number of pronounced locking positions corresponding to the contraction phases of the transmission means.

The chain 26 can readily pass through the bends of the enclosure 35 while it has an extended length close to its maximum length, but it positively locks the two supporting elements as soon as it is compressed and occupies a reduced contracted length. It will be seen that the supporting element 21 suspended from the chain cannot leave the guide because of the limitation of the movement of the opposite element 22 determined by the rivot 27.

The chain 26 forms a reliable and cheap transmission means which is readily housed in any tubular element. It provides effective and reliable locking which is in no way dependent upon friction and without ever jamming in the tube. In the contracted position it also retains the two supporting elements 21 and 22.

Springs 38, 39 may also be provided between the supporting elements and the ends of the tubular guide to facilitate the return of the chain to its extended state when just one of the legs is lifted from the supporting surface.

In variants, other types of chain may also be used, for example chains of the kind illustrated in FIGS. 13 and 14. Other kinds of thrust element may also be used. For example, use may be made of the element shown in FIG. 15 which comprises thrust elements 36, or beads threaded on a flexible cable 37.

In a further variant, the chain is accommodated in an enclosure which has no abrupt ends but which has other irregularities of shape or section to allow free passage of the chain in the extended condition and effective locking in the compressed position when the two supporting elements bear on a supporting surface.

I claim:

1. A leg-type support with automatic adjustment, comprising at least two vertically movable supporting elements and a transmission means coupling the supporting elements and so arranged that one of the supporting elements descends when the other is pushed upwardly, the transmission means consisting of balls and a tubular guide accommodating the balls and having at least one constriction, the balls changing their relative positions on the combined movement of the supporting elements, and the tubular guide being so designed that the relative movement of the balls results in alternate elongation and contraction phases of the effective length of the transmission means so that, when the supporting elements are both retained, pronounced locking positions are obtained which correspond to the contraction phases of the transmission means.

2. A leg-type support with automatic adjustment, comprising at least two vertically movable supporting elements and a transmission means coupling the supporting elements and so arranged that one of the supporting elements descends when the other is pushed upwardly, the transmission means consisting of a chain comprising rigid links pivoted with respect to one another and a tubular guide accommodating the chain and having at least one abrupt constriction, the chain links changing their relative positions on the combined movement of the supporting elements, and the tubular guide being so designed that the relative movement of the chain links results in alternate elongation and contraction phases of the effective length of the transmission means so that, when the supporting elements are both retained, pronounced locking positions are obtained which correspond to the contraction phases of the transmission means, the tubular guide having the general shape of a U and two ends, the two supporting elements being telescopically slidable in the guide ends, the abrupt constriction being designed to permit the chain to pass therethrough with play in the absence of pressure on the chain, and the length of each chain link and the inner diameter of the tubular guide at the abrupt constriction being such that pressure on the chain causes pivoting of a respective link at the abrupt constriction and a corresponding spreading of the chain in the tubular guide at the abrupt constriction thereof.

3. The support of claim 2, in which the tubular guide has two of said constrictions each of approximately 90°.

4. The support of claim 2 in which the tubular guide has two of said constrictions each of 80° to 100°.

* * * * *